United States Patent Office 2,732,384
Patented Jan. 24, 1956

2,732,384

3-KETO-11β-HYDROXY-4,17(20)-PREGNADIENE-21-al AND PROCESS

Philip F. Beal III, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application June 8, 1953,
Serial No. 360,374

2 Claims. (Cl. 260—397.45)

This invention relates to a novel steroid, more particularly, 3-keto-11β-hydroxy-4,17(20)-pregnadiene-21-al, the provision of which is an object of the present invention. Other objects will be apparent to those skilled in the art to which this invention pertains.

The novel 3-keto-11β-hydroxy-4,17(20)-pregnadiene-21-al may be represented by the following structural formula:

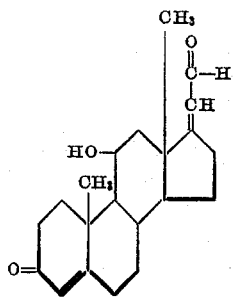

and is prepared by the reaction of 11β,21-dihydroxy-4,17(20)-pregnadiene-3-one with manganese dioxide, as illustrated in the examples hereinafter. Thus, although secondary alcohols are well known to be more easily oxidized than primary alcohols, the starting 11β,21-dihydroxy-4,17(20)-pregnadiene-3-one which contains a primary 21-hydroxy group and a readily oxidizable secondary 11β-hydroxy group, was found to be selectively oxidized, leaving the reactive secondary 11β-hydroxy group intact and preferentially oxidizing the primary 21-hydroxy group to a 21-aldehyde, producing 3-keto-11β-hydroxy-4,17(20)-pregnadiene-21-al.

The novel 3-keto-11β-hydroxy-4,17(20)-pregnadiene-21-al is a very useful chemical intermediate, which can, for example, be readily converted to the physiologically active hydrocortisone (Kendall's Compound F) by reaction with osmium tetroxide to produce 3-keto-11β,17α,20-trihydroxy-4-pregnene-21-al, which is rearranged by heating in the presence of pyridine to 11β,17α,21-trihydroxy-4-pregnene-3,20-dione (Kendall's Compound F).

Solvents which may be used in the reaction include acetone, carbon tetrachloride, ethyl acetate and other organic solvents substantially inert to manganese dioxide.

The reaction temperature does not appear to be critical and temperatures from about zero to about 100 degrees centigrade may be employed. The reaction time required to achieve substantially complete reaction is somewhat dependent upon the reaction temperature. A large molar equivalent excess of manganese dioxide is usually employed to achieve optimum yields of desired product. Usually the reaction requires less than eight hours to reach completion.

The starting 11β,21-dihydroxy-4,17(20)-pregnadiene-3-one can be prepared in the following manner: 11-keto-progesterone is condensed with ethyl oxalate in the presence of a molar equivalent of sodium methoxide to produce the sodium enolate of 11-keto-21-ethoxyoxalylprogesterone, which is borminated with two molar equivalents of bromine and then reacted with sodium methoxide and methanol, to produce 3,11-diketo-4,17(20)-pregnadiene-21-oic acid methyl ester. This steroid is ketalized with ethylene glycol to produce 3-ethylene glycol ketal of 3,11-diketo-4,17(20)-pregnadiene-21-oic acid methyl ester which is reduced with lithium aluminum hydride in ether and the ketal group then hydrolyzed with dilute hydrochloric acid to produce 11β,21-dihydroxy-4,17(20)-pregnadiene-3-one, all as further disclosed in our copending application S. N. 307,385, filed August 20, 1952.

The following examples are illustrative of the methods of producing the compound of the present invention, but are not to be construed as limiting.

*Example 1.—3-keto-11β-hydroxy-4,17(20)-pregnadiene-21-al*

A suspension of three grams (9.09 millimoles) of 11β,21-dihydroxy-4,17(20)-pregnadiene-3-one and fifteen grams of activated manganese dioxide [See Attenburrow et al., J. Chem. Soc., 1094 (1952) for a method of preparation] in 150 milliliters of ethyl acetate was shaken in a stoppered flask at room temperature for two hours. The mixture was filtered, the cake washed with 100 milliliters of ethyl acetate and the combined filtrates were freed of solvent by distillation at reduced pressure. The three-gram residue was dissolved in 300 milliliters of methylene chloride and poured over 300 grams of Florisil synthetic magnesium silicate. The column was developed with 300-milliliter portions of solvents of the following composition and order: four of Skellysolve B hexane hydrocarbons plus ten percent acetone, eight of Skellysolve B plus thirteen percent acetone, and seven of Skellysolve B plus fourteen percent acetone. Upon concentration of the individual fractions, crystals precipitated from the thirteenth through the eighteenth 300-milliliter eluate fractions. These crystals were filtered and combined to yield 1.84 grams of 3-keto-11β-hydroxy-4,17(20)-pregnadiene-21-al which, after recrystallization, melted at 182 to 184 degrees centigrade. The mother liquor from the filtration yielded another forty milligrams of product.

*Example 2.—3-keto-11β-hydroxy-4,17(20)-pregnadiene-21-al*

In the same manner as described in Example 1, 11β,21-dihydroxy-4,17(20)-pregnadiene-3-one was converted to 3-keto-11β-hydroxy-4,17(20)-pregnadiene-21-al by reaction with manganese dioxide suspended in carbon tetrachloride at close to the boiling point of the mixture.

It is to be understood that the invention is not to be limited to the exact details or exact compounds shown and described, as obvious modifications and equivalents will be apparent to one skilled in the art and the invention is therefore to be limited only by the scope of the appended claims.

We claim:
1. 3-keto-11β-hydroxy-4,17(20)-pregnadiene-21-al.
2. A process for the production of 3-keto-11β-hydroxy-4,17(20)-pregnadiene-21-al which comprises reacting 11β,21-dihydroxy-4,17(20)-pregnadiene-3-one with manganese dioxide in an organic solvent to produce 3-keto-11β-hydroxy-4,17(20)-pregnadiene-21-al.

No references cited.